United States Patent [19]

Kennedy et al.

[11] Patent Number: 4,905,886
[45] Date of Patent: Mar. 6, 1990

[54] METHOD FOR DIFFUSION BONDING OF METALS AND ALLOYS USING THERMAL SPRAY DEPOSITION

[75] Inventors: James R. Kennedy, Huntington; Edmund Y. Ting, Flushing, both of N.Y.

[73] Assignee: Grumman Aerospace Corporation, Bethpage, N.Y.

[21] Appl. No.: 221,973

[22] Filed: Jul. 20, 1988

[51] Int. Cl.$^4$ ............................................. B23K 20/16
[52] U.S. Cl. .................................. 228/194; 427/53.1; 427/34; 228/203
[58] Field of Search .................. 228/203, 193, 194; 427/35, 43.1, 53.1, 34

[56] References Cited

U.S. PATENT DOCUMENTS

| | | |
|---|---|---|
| 3,552,898 | 1/1971 | Bird et al. |
| 3,619,548 | 11/1971 | Cavagnero . |
| 3,680,197 | 8/1972 | Blum et al. |
| 3,758,741 | 9/1973 | Holko et al. |
| 3,815,219 | 6/1974 | Wilson . |
| 4,157,923 | 6/1979 | Yen et al. ............................ 427/53.1 |
| 4,200,669 | 4/1980 | Schaefer et al. ................... 427/53.1 |
| 4,452,389 | 5/1984 | Amin . |
| 4,592,120 | 6/1986 | Egan et al. .......................... 228/194 |
| 4,732,312 | 3/1988 | Kennedy . |
| 4,743,733 | 5/1988 | Mehta et al. ....................... 427/53.1 |

FOREIGN PATENT DOCUMENTS 287069 6/1968 U.S.S.R. .

OTHER PUBLICATIONS

Irving, Robert R., "Amorphous Metals: The New Metallurgy," Iron Age, May 11, 1983, pp. 47–52.
Jones, H., "The Status of Rapid Solidification of Alloys in Research and Application," Journal of Materials Science 19 (1984) pp. 1043 and 1044.

*Primary Examiner*—Kenneth J. Ramsey
*Attorney, Agent, or Firm*—Pollock, VandeSande & Priddy

[57] ABSTRACT

Diffusion bonding of aluminum alloy objects of different sizes and shapes may be greatly improved when the surface of the object is exposed to a thermal spray source which deposits fine metal particles on the surface. Rapid quenching of solidification occurs at the surface. Such treatment results in the formation of finer grains at the surface which enhances the strength of a diffusion bond.

8 Claims, 3 Drawing Sheets

METHOD FOR DIFFUSION BONDING OF METALS AND ALLOYS USING THERMAL SPRAY DEPOSITION

FIELD OF THE INVENTION

The present invention relates to diffusion bonding, and more particularly to the diffusion bonding of alloy materials having plate or irregular shapes.

BACKGROUND OF THE INVENTION

As explained in our U.S. Pat. No. 4,732,312, which issued on Mar. 22, 1988, the combined use of superplastic forming and diffusion bonding (SPF/DB) offers the potential to manufacture lighter and less expensive aircraft structures than those made by conventional means. It is particularly attractive for sheet metal structures because part and fastener counts could be reduced, thereby significantly decreasing assembly labor. Also the fabrication of structures to near-net shapes using SPF/DB technology can improve material utilization and reduce machining time and costs.

The application of SPF/DB to titanium alloys has been well demonstrated but this is not the case for advanced high strength aluminum alloys. Although impressive SPF behavior has already been demonstrated for aluminum alloys, such as 7475, and work has begun on developing superplastic properties for Al-Li alloys, the diffusion bonding technology for these materials is lagging. A simple and cost-effective diffusion bonding technique compatible with SPF technology could significantly advance the use of aluminum structures.

In diffusion bonding, flattening of the abutting surfaces is necessary in order to achieve intimate interfacial contact. Metals like titanium, which have surface oxides that easily dissolve in the metal during heating, can be readily diffusion bonded without the use of special surface preparations or interlayer diffusion aids. Unlike titanium, aluminum and its alloys (as well as, for example, zirconium and vanadium and their respective alloys) form insoluble oxides which do not readily dissolve during bonding and thus act as barriers to intimate metal-to-metal contact and subsequent diffusion.

Typically, aluminum has been diffusion bonded by methods which rely upon considerable deformation (up to 60 percent) and pressure (up to 40,000 psi) to rupture surface materials to dissolve oxides and aid diffusion. In general, such methods are not compatible with the constraints imposed by SPF technology or the mechanical property requirements of a high performance structure. For example, practical limitations set by production equipment dictate that SPF pressures probably should be limited to 1,000 psi and perhaps should be much lower. In addition, other variables important to SPF, such as starting microstructure, dwell time, forming rate, dynamic recrystallization, and post heat treatment must be considered.

Aluminum has also been diffusion bonded by removing the surface oxide layers by sputtering or other suitable techniques in a hard vacuum or reduced pressure inert gas environment in order to prevent the oxide layer from being formed again before bonding. However, pressures below $10^{-9}$ Torr must be maintained in order to keep the oxide layer from forming again almost instantly in a hard vacuum and pressures of approximately $10^{-6}$ Torr in an inert gas environment are desirable. In other words, using these techniques, the cleaned surfaces cannot be exposed to air prior to bonding. It is generally believed that cleaning techniques such as abrading, chemical etching or dissolving the oxide by use of fluxes, if carried out in a vacuum or low pressure inert gas environment, to preserve the oxide cleaned surface, present problems in controlling removal of oxides from the work, etching solutions or the process chamber.

In our U.S. Pat. No. 4,732,312, a method is discussed for achieving diffusion bonding of surface layers of an alloy sheet, such as aluminum, having surface oxide coatings of low solubility in the alloy. The discussed method comprises the steps of: treating said alloy so that at least the surface layers to be bonded have a fine grain structure; removing existing surface oxide coatings from the surface layers to be bonded; diffusion bonding the surface layers to one another by placing the alloy to be bonded under a pressure sufficient to cause disruption of the oxide coatings and insufficient to cause macroscopic deformation of the alloy, while heating the alloy in a non-oxidizing atmosphere for a time sufficient for diffusion bonding to occur. Generally, the deformation will approach zero percent or a very low amount on a macroscopic scale. Pressures of less than 1,000 psia and preferably less than 100 psia may be applied to force the surfaces together. The diffusion bonding generally takes place at temperatures below the melting point of the alloy by several degrees centigrade or at the superplastic forming temperature for a time ranging between one and ten hours. At least one part of the diffusion bonded assembly may be superplastically formed to produce a structurally useful component of a predetermined configuration.

More important to the present invention, the method of our mentioned patent may also comprise the step of treating alloy sheets so that the alloy, or at least the surface layers thereof, have a fine grain structure of the type associated with superplastic forming properties. This is done by thermomechanically processing the surface layers of the sheets by heated rollers. Enhanced localized surface deformation of such alloys uring bonding resulting from the superplastic microstructure leads to extensive oxide film disruption, thus facilitating bonding.

After diffusion bonding (and superplastic forming) the bonded structure may be further heat treated by solution treating, quenching and aging.

The surfaces to be bonded are prepared by abrading with successively finer grades of grinding paper, rinsing with water, abrading with a metallic brush, and removing the brushings. The abrading may be performed by abrading in a first direction, and abrading in a second direction substantially at right angles to the first direction. The brushings may be removed by exposing the surfaces to a stream of filtered compressed air moving at a velocity sufficiently high to remove the brushings.

Pressure may be applied to the components to be bonded by forcing the surfaces together by placing the components in a fixture, exposing a first opposite surface to a first surface layer to be diffusion bonded to one of a partial vacuum and a pressurized gas and exposing a second opposite surface to a second surface layer to be diffusion bonded to another of said partial vacuum and pressurized gas.

Although the method of our patent achieves success with sheet materials, thermomechanical rolling of thick plates, bars, and irregularly shaped alloy materials is impractical or impossible, thereby preventing surface treatment of these materials to achieve surface fine grain structure of the type associated with superplastic microstructure.

BRIEF DESCRIPTION OF THE PRESENT INVENTION

The present invention is directed to an improvement of the surface treatment disclosed in our mentioned patent. Whereas that application was directed to treating at least the surface layers of sheet material with thermomechanical means, a need still exists for creating a surface microstructure in alloy materials, such as aluminum, which are fabricated in thicker plates or irregularly shaped objects. The improvement of the present invention is centered about the discovery that the surface of alloy materials having any shape may be modified by a thermal spray source to produce a deposited layer of fine-grained microstructure that will enhance diffusion bonding. The great advantage of such a method is that it could permit deposition of a superplastic thin surface layer for subsequent diffusion bonding of practically any metallic material and for components in virtually any size or shape. This could lead to the fabrication of unique hybrid structures wherein the main thickness of the material is not fine-grained and superplastic while the near surface layer is fine-grained and superplastic.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

The proposed invention is a method for fabricating diffusion bonded or superplastically formed and diffusion bonded (SPF/DB) structures, wherein any metal or alloy, which may or may not be initially superplastic, is joined at selected areas by diffusion bonding. According to such method, the metal or alloy to be diffusion bonded is first subjected to a prescribed surface treatment for the purpose of modifying its surface properties. The modification involves surface deposition of metal which ultimately forms a fine grain layer. Such treatment results in the formation of amorphous, microcrystalline, or metastable phases, depending on structural and kinetic factors. Thermal spray sources, have been used for surface modification in other applications and are ideally suited for this method. Material may be surface molten or semimolten metal deposited and rapidly cooled because of the self-quenching effect provided by the unheated internal bulk material. Control of energy source parameters will result in an optimized microstructure which is suitable for the subsequent diffusion bonding stage. Thus, a thin layer of fine grain, superplastic material can be produced in an otherwise non-superplastic material. Similarly, a thin metastable surface layer will subsequently undergo transformation to a desired microstructure either before or during the thermal cycle imposed by diffusion bonding. Diffusion bonding will be greatly enhanced in surface modified materials because of improved flow and contact of the mating pieces. Furthermore, in metals with stable oxides, such as aluminum and its alloys, diffusion bonding will be further enhanced after surface modification because of increased surface movements during bonding which lead to the disruption and break-up of surface oxides.

Figure 1:
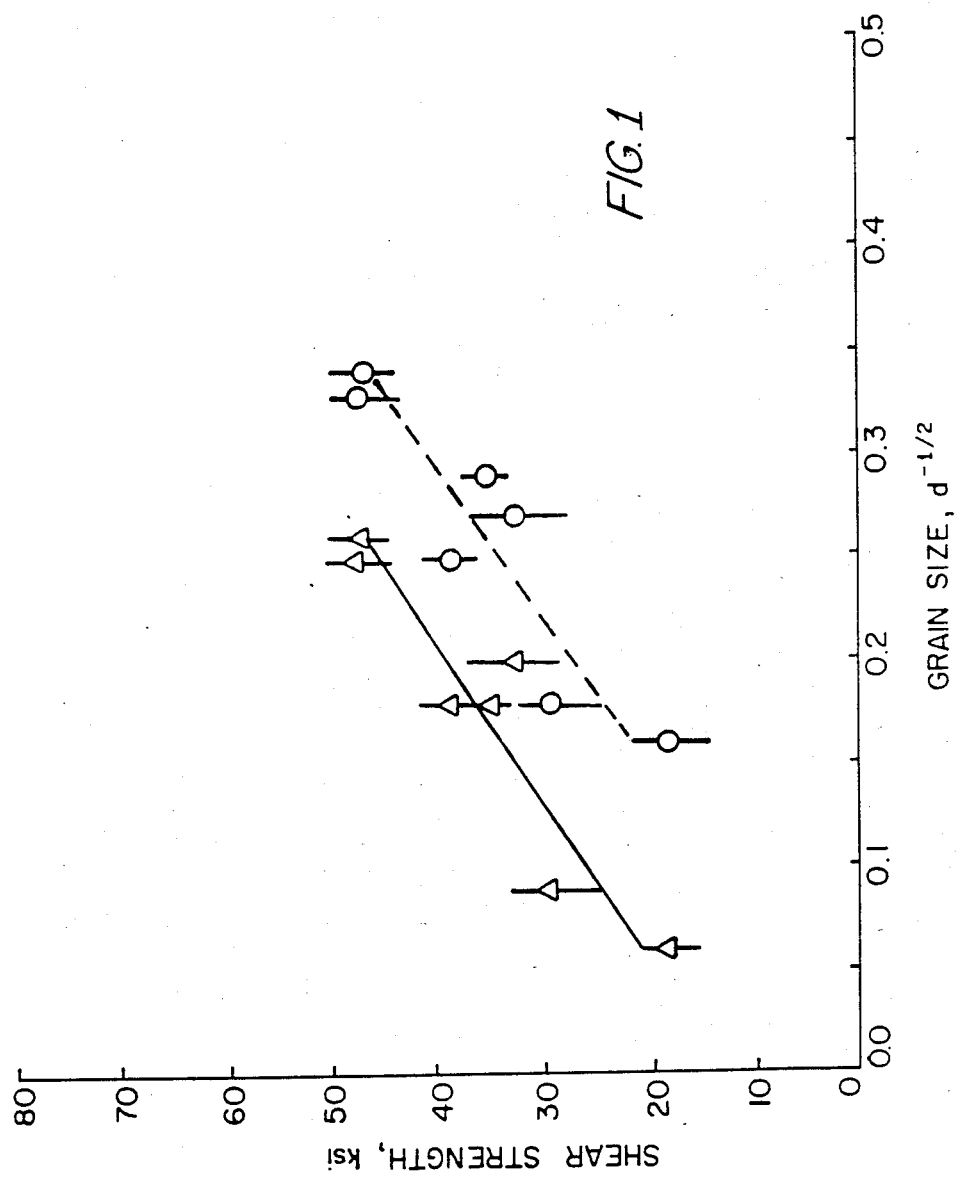
FIG. 1 is a graphical plot of two alloy samples comparing grain size with bond strength.

FIG. 1 indicates two graphical plots to dramatize the bond strength increases with fine grain size. Each of the plots represents a separate sample of 7475-T6 aluminum alloy. Each plot illustrates the linear increase of shear strength (bond strength) as a function of smaller grain size.

The present invention recognizes the desirability for achieving fine grain size near the surface of alloy material and overcomes the previous limitation that such fine grain size associated with superplastic alloy materials could only be achieved with relatively thin sheet materials.

Figure 2:
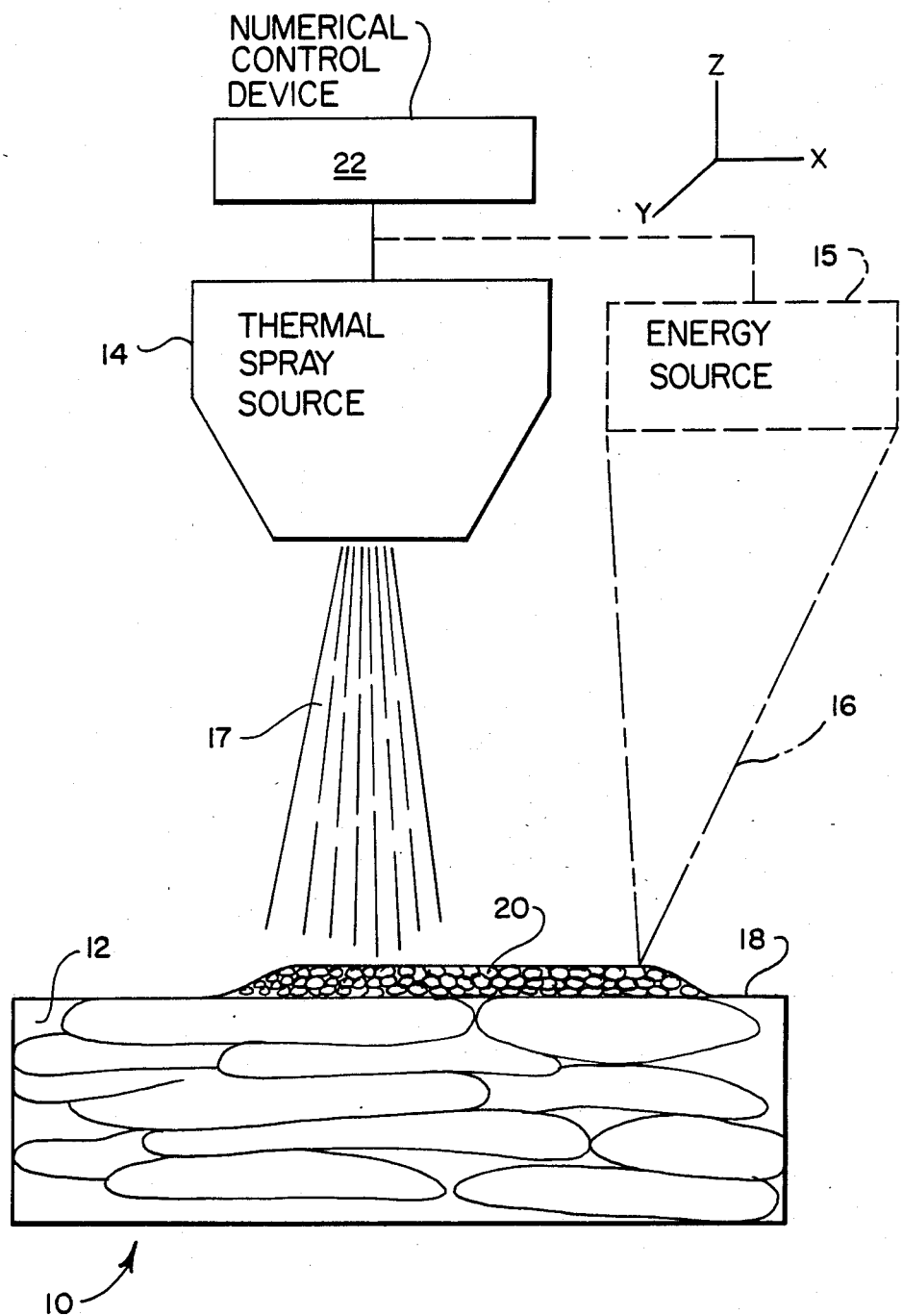
FIG. 2 is a schematic illustration of the method of the present invention utilizing a thermal spray source for depositing a fine grained surface layer.

FIG. 2 schematically illustrates an alloy block 10 which is not superplastic as supplied. Thus, the alloy is comprised of relatively large grains, as indiated by reference numeral 12. In order to produce a fine grain layer at the surface of the plate, the present invention has discovered that fine metallic particles may be deposited in a molten or semimolten condition to form a layer on the base metal. This layer will be fine grained due to the ensuing rapid solidification on the cold metal base. Thermal spraying deposition is a preferred method for depositing the fine metallic particles. Such deposition would include processes such as plasma spraying, flame spraying, electric arc spraying and other liquid metal atomization techniques.

In order to move the energy source 14 relative to the plate surface 18, it is possible to utilize a conventional numerical control device 22, such as is prevalently utilized in robotics and machine tool controls. In the case of a flat block 10, as shown in FIG. 2, the numerical control device need move the energy source 14 at a constant speed across the surface 18 so that each point receives substantially the same amount of deposited metal from the source. Alternatively, the block 10 may be moved relative to a stationary source 14. This would typically involve a movable table (not shown) upon which the block rests. The table would be moved in the x-y plane by a numerical control device such as 22. This will result in a desirable uniform grain reduction along a surface layer. Thus, in such an application the energy source and plate need only undergo relative translational motion along x and y coordinates.

The significant advantage of the present invention is that it is capable of operating with various alloys, whether they are supplied as a superplastic or non-superplastic material. A still further significant advantage is the ability of the present invention to refine the grain in an alloy object having almost any shape and thickness. Of course, in the event a non-planar object is to be worked upon, the numerical control device 22 must be capable of undergoing three-dimensional motion along x, y and z coordinates. Many types of appropriate numerical control devices for accomplishing these ends are commercially available. Routine experimentation is necessary to determine the exposure parameters of the alloy material to the energy source.

As a result of the method of the invention, the surface is modified so that there results the formation of amorphous, microcrystalline, or metastable phases, depending on structural and kinetic factors. The result of the method is the production of a thin layer of fine grain, superplastic material in an otherwise non-superplastic material. Similarly, a thin metastable surface layer will subsequently undergo transformation to a desired microstructure either before or during the thermal cycle imposed by diffusion bonding. Diffusion bonding will be greatly enhanced in surface modified materials because of improved flow and contac of the mating pieces. Furthermore, in metals with stable oxides, such as aluminum and its alloys, diffusion bonding will be further enhanced after surface modification because of increased surfaoe movements during bonding which lead to the disruption and break-up of surface oxides.

The present method may be used in conjunction with the high energy source process disclosed in our copending U.S. application Ser. No. 193,615. The purpose of using such a high energy source would be to add a finishing step, after thermal spraying. The finishing step would involve the exposure of the deposited surface layer to a high energy source 15 (FIG. 2) which would further optimize the grain structure of the surface layer 20. The high energy source 15 has been disclosed as a laser source but may include other types of high energy sources. In order to expose a selected surface area, the energy source 15 could also be connected to a numerical control device 22 as indicated in the figure. The energy output 16 from source 15 can be very accurately moved along the area where the deposited surface layer 20 exists.

Figure 3A:
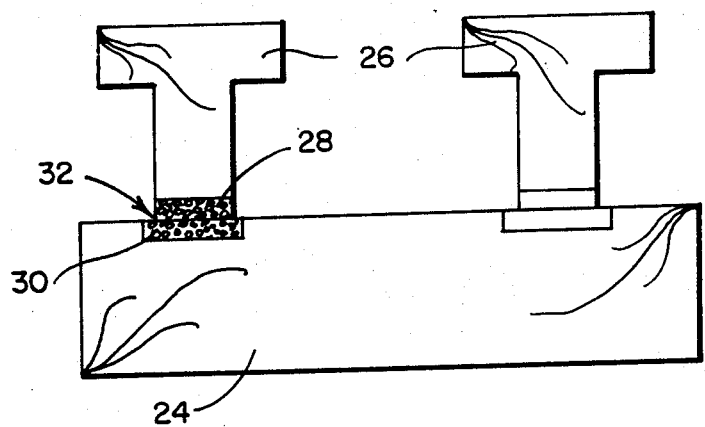
FIG. 3A is a diagrammatic sectional view illustrating the diffusion bonding between refined grain structures at the interface of extrusions and a baseplate.
Figure 3B:
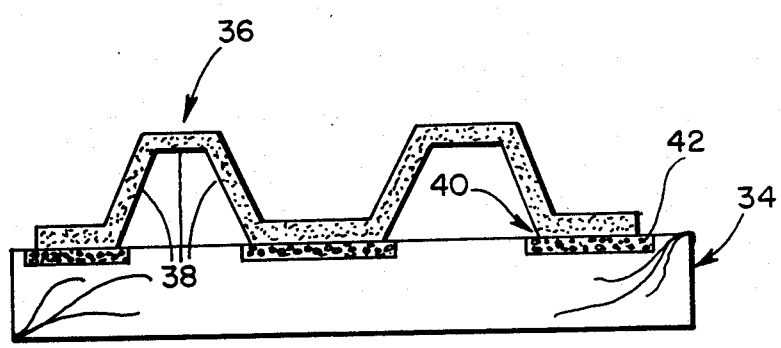
FIG. 3B is a diagrammatic cross-sectional view illustrating diffusion bonding between a fine-grained superplastic sheet and a fine-grained region in the surface layer of a baseplate.

FIGS. 3A and 3B are diagrammatic sectional views of structures indicating the regions which achieve diffusion bonding. In FIG. 3A a baseplate 24 has several parallel spaced extrusions 26 mounted thereto. The mounting is accomplished by diffusion bonding between a baseplate 24 and a plurality of parallel spaced extrusions 26. More particularly, a fine-grained region 28 in each extrusion 26 is brought into diffusion contact with a mating fine-grained region 30 in the baseplate 24. Diffusion bonding between these fine-grained regions will occur at interface 32.

Similarly, diffusion bonding may be achieved between a fine-grained superplastic sheet 36 and baseplate 34. The diagrammatic cross-sectional view of FIG. 3B indicates that the sheet 36 is characterized by a fine-grained superplastic body 38. Several spaced fine-grained regions 42 characterize the upper surface of plate 34 and the intention is for base sections of the sheet 36 to contact (40) the fine-grained areas 42 of the base so that diffusion bonding therebetween may be realized.

It should be understood that the invention is not limited to the exact details of construction shown and described herein for obvious modifications will occur to persons skilled in the art.

We claim:
1. A method for enhancing diffusion bonding for an object made of an alloy, the method comprising the steps:
   positioning a selected surface area of an object to a thermal spray source; and
   depositing molten or semi-molten material to form a coating or layer on the surface area resulting in the formation of a fine-grained microstructure therein exhibiting superplastic properties.
2. The method set forth in claim 1 wherein the source is moved relative to the surface area while the coating is deposited.
3. The method set forth in claim 1 together with the steps of:
   exposing the selected surface area of the object to radiation from a high energy source;
   melting only a surface layer of the selected area;
   quickly cooling the surface layer;
   producing solidification of the surface layer which results in the formation of optimized fine-grained microstructure therein exhibiting superplastic properties.
4. The method set forth in claim 1 wherein the depositing step results from plasma spraying.
5. The method set forth in claim 1 wherein the depositing step results from electric arc spraying.
6. The method set forth in claim 1 wherein the depositing step results from flame spraying.
7. A method for enhancing diffusion bonding for an object made of an alloy, the
   positioning a selected surface area of an object to a thermal spray source; and
   depositing a coating of preselected fine-grained metal particles on the surface area as the area is moved relative to the source resulting in the even formation of a fine-grained microstructure therein exhibiting superplastic properties;
   exposing the selected surface area of the object to radiation from a high energy source;
   melting only a surface layer of the selected area;
   quickly cooling the surface layer;
   producing solidification of the surface layer which results in the formation of a fine-grained microstructure therein exhibiting superplastic properties.
8. The method set forth in claim 1 wherein the step of cooling the exposed area results in an intermediate metastable phase, capable of transforming to a fine-grained microstructure either before or during bonding.

* * * * *

UNITED STATES PATENT AND TRADEMARK OFFICE
CERTIFICATE OF CORRECTION

PATENT NO. : 4,905,886
DATED : March 6, 1990
INVENTOR(S) : James Kennedy, et al.

It is certified that error appears in the above-identified patent and that said Letters Patent is hereby corrected as shown below:

Column 2, line 40, change "uring" to --during--.

Column 5, line 15, change "contac" to --contact--.

Column 5, line 19, change "surfaoe" to --surface--.

Column 6, line 37, after "the" insert --method comprising the steps:--.

Signed and Sealed this

Twenty-third Day of July, 1991

Attest:

HARRY F. MANBECK, JR.

Attesting Officer

Commissioner of Patents and Trademarks